United States Patent
Imazawa et al.

(10) Patent No.: US 10,938,248 B1
(45) Date of Patent: Mar. 2, 2021

(54) CONTACTLESS POWER SUPPLY DEVICE

(71) Applicant: OMRON Corporation, Kyoto (JP)

(72) Inventors: Takanori Imazawa, Ichinomiya (JP); Goro Nakao, Inazawa (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 16/934,701

(22) Filed: Jul. 21, 2020

(30) Foreign Application Priority Data

Aug. 28, 2019 (JP) .............................. JP2019-156015

(51) Int. Cl.
*H02J 50/12* (2016.01)
*H02J 50/80* (2016.01)
*H02M 7/5387* (2007.01)

(52) U.S. Cl.
CPC .............. *H02J 50/12* (2016.02); *H02J 50/80* (2016.02); *H02M 7/5387* (2013.01)

(58) Field of Classification Search
CPC ............ H02J 50/10; H02J 50/12; H02J 50/80; H02M 7/5387
USPC ...................................................... 307/104
See application file for complete search history.

(56) References Cited

U.S. PATENT DOCUMENTS

2017/0149285 A1    5/2017  Ushijima et al.
2017/0279310 A1*   9/2017  Ii .............................. H02J 50/80

FOREIGN PATENT DOCUMENTS

WO         2015173850 A1    11/2015

* cited by examiner

*Primary Examiner* — William Hernandez
(74) *Attorney, Agent, or Firm* — Metrolex IP Law Group, PLLC

(57) ABSTRACT

A contactless power supply device includes a power transmitter, and a power receiver. The power receiver includes: a resonant circuit including a receiver coil and a resonant capacitor; a rectifier circuit configured to rectify the power output from the resonant circuit; a voltage detection circuit configured to measure the output voltage from the rectifier circuit and obtain a measurement value for said output voltage; and a first communication device. The power transmitter includes: a transmitter coil; a power supply circuit including a power source and a plurality of switching elements between the power source and the transmitter coil; an auxiliary coil for electromagnetic coupling with the transmitter coil; a variable capacitance circuit configured to connect to the auxiliary coil and adjust the electrostatic charge therein; and a control circuit configured to control the electrostatic charge in the variable capacitance circuit in accordance with the measurement value for the output voltage.

2 Claims, 6 Drawing Sheets

CONTACTLESS POWER SUPPLY DEVICE

CROSS-REFERENCE TO RELATED APPLICATIONS

This application claims the priority of Japanese Patent Application Number 2019-156015 filed on Aug. 28, 2019 which is hereby incorporated by reference.

FIELD

The disclosure relates to a contactless power supply device.

BACKGROUND

Methods known for transmitting power through the air without relying on metal contacts or the like, i.e., contactless power supply (also known as wireless power supply) have been the subject of research.

In one example of such a method of contactless power supply technology, only a secondary (receiver) coil is made up of a resonant circuit. The phase information for the resonant current flowing through the resonant circuit is detected, the drive frequency of a primary (transmitter) coil is defined on the basis of the phase information so that the current phase of the drive current flowing through the primary coil is slightly delayed from the voltage phase, and the primary coil driven with this drive current (see for instance, International Publication Number 2015/173850). A Q factor, defined by equal load resistance between the leak inductance of the secondary coil and the capacitance of the resonant capacitor, is established as a value at or equal to Q=2/k2 (where k is a coupling coefficient). This feature minimizes heating in the primary coil and ensures that a frequency most suitable for the power rate of the primary coil is automatically selected as the drive frequency. The configuration also reduces both copper loss and switching loss.

Technical Problem

However, the above mentioned features requires higher Q factors in order to establish a suitable drive frequency. The inductance of the receiver-side coil must increase in order to increase the Q factor, and to do that requires a larger receiver-side coil. As a result, the footprint of the overall device increases.

Therefore, to address the foregoing, embodiments provide a contactless power supply device that is capable of improving the power transmission efficiency thereof via a simple configuration.

SUMMARY

One embodiment provides a contactless power supply device including a power transmitter, and a power receiver configured to accept a power transmission from the power transmitter without contact. The power receiver in the contactless power supply device includes a resonant circuit including a receiver coil and a resonant capacitor for resonating with the receiver coil and configured to receive power from the power transmitter; a rectifier circuit configured to rectify the power output from the resonant circuit; a voltage detection circuit configured to measure the output voltage of the power output from the rectifier circuit and obtain a measurement value for said output voltage; and a first communication device configured to transmit a signal containing the measurement value for the output voltage to the power transmitter. The power transmitter includes a transmitter coil configured to supply power to the power receiver via the receiver coil; a power supply circuit including a power supply configured to supply direct-current power, and a plurality of switching elements connected in a full-bridge or half-bridge configuration between a power source for supplying direct-current power and the transmitter coil; the plurality of switching elements switching between on and off states at a predetermined frequency to thereby convert the direct-current power supplied by the power source into alternating-current power of a predetermined frequency which is supplied to the transmitter coil; an auxiliary coil configured for electromagnetic coupling with the transmitter coil; a variable capacitance circuit configured for connection to the auxiliary coil, and the variable capacitance circuit configured to allow adjustment of the electrostatic charge therein; a second communication device configured to receive a signal from the power receiver containing the measurement value for the output voltage; and a control circuit configured to control the electrostatic charge in the variable capacitance circuit in accordance with the measurement value for the output voltage. A contactless power supply device thusly configured is capable of improving the power transmission efficiency thereof via a simple configuration.

The control circuit in the power transmitter of the contactless power supply device may be configured to reference a reference table expressing a relationship between the present value of the electrostatic charge in the variable capacitance circuit and the electrostatic charge after a change when a measurement value for the output voltage is within a predetermined lower limit threshold or exceeds a predetermined upper limit threshold that is greater than the predetermined lower limit threshold, and control the variable capacitance circuit so that the present electrostatic charge becomes the electrostatic charge after the change. The contactless power supply device is thus capable of minimizing the peak value of the current flowing in a switching element in the power supply circuit when the switching element is turned off, and is therefore capable of reducing the switching loss in the switching elements. Moreover, the contactless power supply device is thus capable of preventing an excess increase in the RMS value of the current flowing in the auxiliary coil and reduce the conduction loss from the current flowing in the auxiliary coil.

DETAILED DESCRIPTION

A contactless power supply device according to an embodiment is described below with reference to the drawings. The contactless power supply device according to an embodiment has a device on the power transmitting side (referred to below as simply power transmitter device) which includes a coil used for power transmission (referred to below as a transmitter coil), an auxiliary coil provided capable of electromagnetic coupling, a variable capacitance circuit, constituted by an LC circuit for connecting to the auxiliary coil, and a control circuit for controlling the electrostatic charge in the variable capacitance circuit. Meanwhile the device on the power receiving side (referred to bellow as simple a power receiver) measures an output voltage from the power received from the power transmitter via a coil for receiving power (referred to below as a receiver coil) in a resonant circuit, and sends the measurement value of the output voltage measured to the power transmitter. The output voltage varies in accordance with the coupling coefficient between the transmitter coil and receiver coil. For the switching elements in the power supply circuit, which supplies alternating-current power to the transmitter coil, the amount of delay in the phase of the current flowing in the switching elements with respect to the phase of the voltage applied to the switching elements varies in accordance with said coupling coefficient. The control circuit in the power transmitter controls the electrostatic charge in the variable capacitance circuit on the basis of the measurement value for the output voltage received from the power receiver. Hereby the contactless power supply device may establish an amount of delay that is suitable for the phase of the current flowing in the switching elements in the power supply circuit with respect to the phase of the voltage applied to the switching elements in the power supply circuit to improve the power transmission efficiency. Given that there is no need to raise the Q factor of the resonant circuit in the power receiver, there is no need to include a large receiver coil in the resonant circuit; as a result, this also simplifies the contactless power supply device overall.

Figure 1:
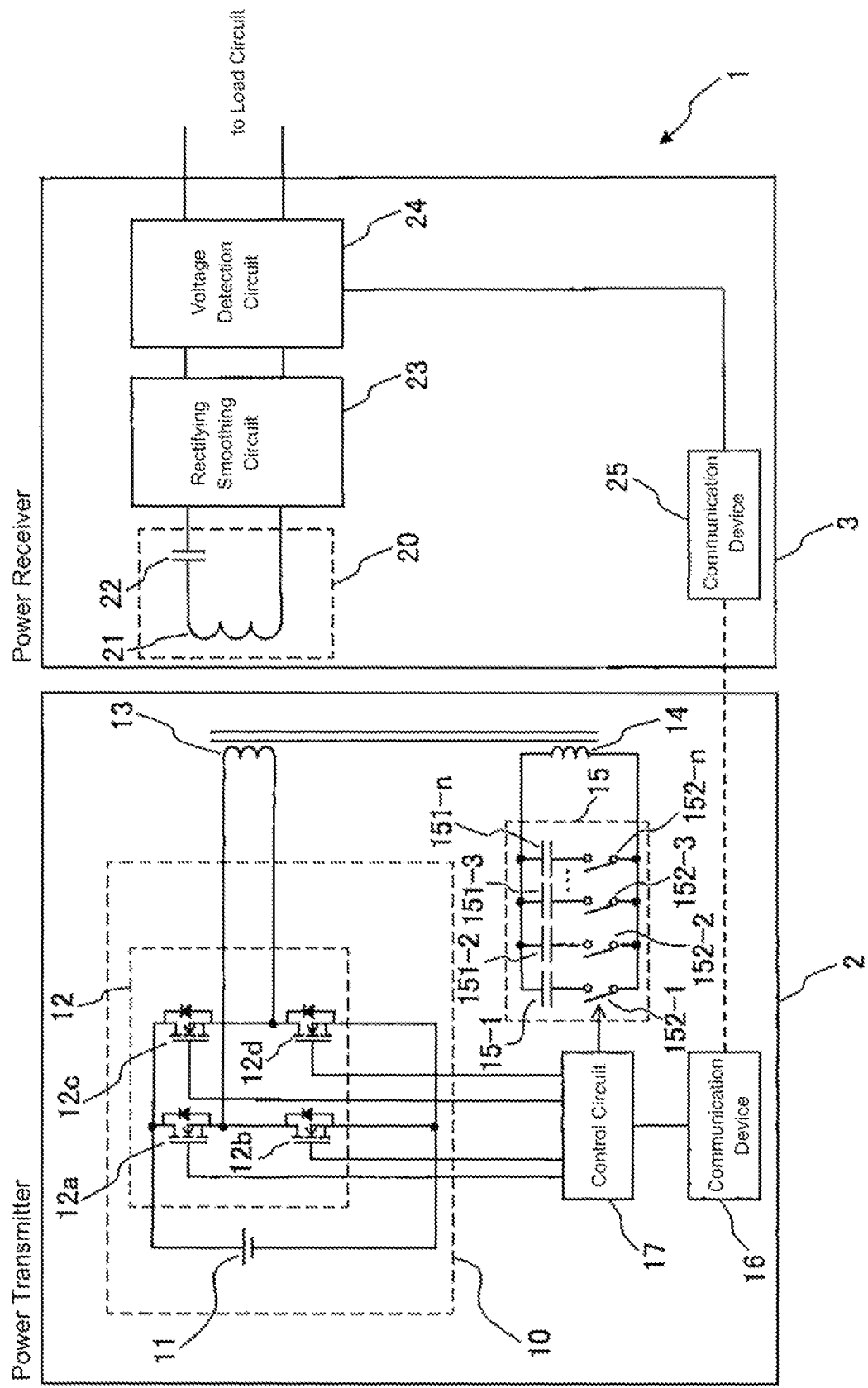
FIG. 1 is a diagram illustrating a schematic overview of a contactless power supply device according to an embodiment.

FIG. 1 is a schematic overview of a contactless power supply device including a power transmitter according to an embodiment; as illustrated in FIG. 1, the contactless power supply device 1 includes a power transmitter 2, and a power receiver 3 to which power is transmitted without contact through the air from the power transmitter 2. The power transmitter 2 includes a power supply circuit 10, a transmitter coil 13, and auxiliary coil 14, a variable capacitance circuit 15, a communication device 16, and a control circuit 17. Meanwhile, the power receiver 3 includes a resonant circuit 20 made up of a transmitter coil 21 and a resonant capacitor 22, a rectifying-smoothing circuit 23, and a voltage detection circuit 24, and a communication device 25. The contactless power supply device 1 according to an embodiment transmits power through series resonance (NS method) wherein the resonant circuit 20 on the power receiving side resonates with respect to the alternating-current power supplied to the transmitter coil 13 without employing the resonance on the power transmitting side. The contactless power supply device 1 may transmit power through parallel resonance (NP method) wherein the resonant circuit 20 on the power receiving side resonates with respect to the alternating-current power supplied to the transmitter coil 13 without employing the resonance on the power transmitting side.

First the power transmitter 2 is described. The power supply circuit 10 supplies alternating-current power to the transmitter coil 13. Therefore, the power supply circuit 10 possesses a power source 11, and an inverter circuit 12.

The power source 11 supplies direct-current power. Therefore, the power source 11 may include a full-wave rectifier circuit connected to a commercial alternating-current power source for rectifying the alternating-current power supplied thereto from the alternating-current power source; and a smoothing capacitor for smoothing the ripple current power output from the full-wave rectifier circuit. The power source 11 converts the alternating-current power supplied thereto from the commercial alternating-current power source into direct-current power and outputs the converted direct-current power to the inverter circuit 12. Note that the power source 11 may be a direct-current power source such as a battery.

The inverter circuit 12 converts the direct-current power supplied thereto from the power source 11 into alternating-current power with a predetermined frequency and supplies the converted alternating-current power to the transmitter coil 13. The predetermined frequency may be assumed to be a frequency at which the resonant circuit 20 in the power receiver 3 resonates at an expected coupling coefficient between the transmitter coil 13 and the receiver coil 21. In an embodiment, the inverter circuit 12 is a full-bridge inverter wherein the switching elements 12a-12d are connected in a full bridge configuration. The switching elements may be n-channel MOSFETs.

In other words, among the four switching elements 12a-12d, switching element 12a and switching element 12b are connected in series between the positive terminal side and the negative terminal side of the power source 11. In an embodiment, the switching element 12a is connected to the positive side of the power source 11 while the switching element 12b is connected to the negative side of the power source 11. Similarly, among the four switching elements 12a-12d, switching element 12c and switching element 12d are connected in parallel to switching element 12a and switching element 12b and in series between the positive terminal side and the negative terminal side of the power source 11. The switching element 12c is connected to the positive side of the power source 11 while the switching element 12D is connected to the negative side of the power source 11.I One end of the transmitter coil 13 is connected between the switching element 12a and the switching elements 12b, and the other end of the transmitter coil 13 is connected between the switching elements 12c and the switching element 12d.

Figure 2:
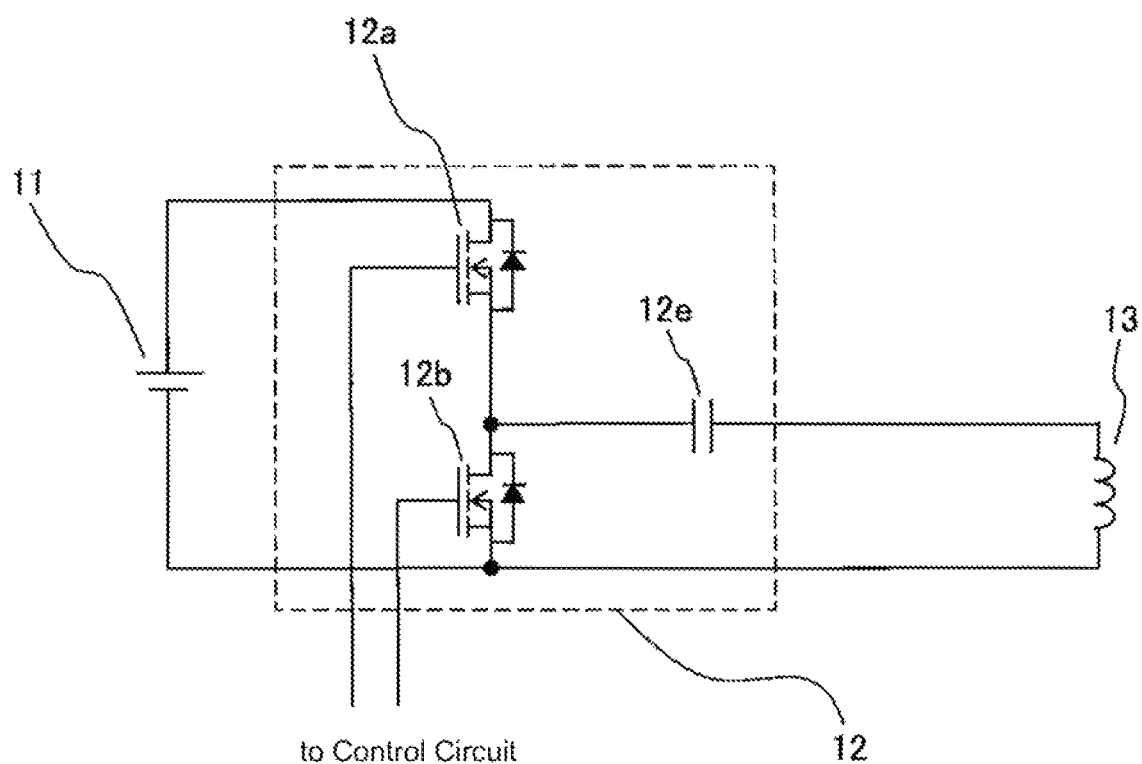
FIG. 2 is a diagram illustrating one example of another inverter circuit.

As illustrated in FIG. 2, the inverter circuit 12 may be a half-bridge inverter wherein two of the switching elements 12a and 12b are connected in a half-bridge configuration with respect to the power source 11. In this case, one end of the transmitter coil 13 is connected between the switching element 12a and switching element 12b via a capacitor 12e while the other ends of the transmitter coil 13 may be connected to ground.

The power transmitter 2 further includes a DC-DC converter (not shown) between the power source 11 in the inverter circuit 12.

The transmitter coil 13 transfers alternating-current power supplied from the power supply circuit 10 to the receiver coil 21 in the power receiver 3 through the air. The power transmitter 2 may include a capacitor connected in series with the transmitter coil 13, between the transmitter coil 13 and the inverter circuit 12 in the power supply circuit 10 for isolating direct-current power.

The auxiliary coil 14 is provided capable of electromagnetic coupling with the transmitter coil 13. Therefore, the auxiliary coil 14 may be wound on the same core as the transmitter coil 13. The number of turns in the auxiliary coil 14 may be same as the number of turns in the transmitter coil 13 or maybe different. The auxiliary coil 14 operates, along with the variable capacitance circuit 15, from the alternating-current power supplied thereto from the transmitter coil 13 and establishes an amount of delay that is suitable for the phase of the current flowing through the switching elements 12a-12d with respect to the phase of the voltage applied to the switching elements 12a-12d in the inverter 12 of the power supply circuit 10. Hereby, the peak value for the current flowing through the switching elements is close to zero when the switching elements 12a-12d are turned off. This reduces the switching loss in the switching elements 12a-12d.

The variable capacitance circuit 15 possesses an adjustable electrostatic charge and is connected to the auxiliary coil 14; the variable capacitance circuit 15 along with the auxiliary coil make up an LC circuit (referred to below as simply an LC circuit) which is one example of a phase adjusting circuit. The LC circuit, that is, the phase adjusting circuit made up of the auxiliary coil 14 and the variable capacitance circuit 15, establishes an amount of delay that is suitable for the phase of the current flowing through the switching elements with respect to the phase of the voltage applied to the switching elements 12a-12d. Note that the LC circuit, made up of the auxiliary coil 14 and the variable capacitance circuit 15, has a resonance frequency that may be different from the frequency of the alternating-current power supplied to the transmitter coil 13. That is, the LC circuit made up of the auxiliary coil 14 and the variable capacitance circuit 15 does not need to resonate with respect to the alternating-current flowing through the transmitter coil 13.

The variable capacitance circuit 15 includes a plurality of capacitors 151-1-171-n (where n is an integer greater than or equal to 1) which are mutually connected in parallel to the auxiliary coil 14, and a plurality of switching elements 152-1-152-n. The capacitor 151-k (where k=1, 2, . . . , n) and the switching element 152-k are connected in series. Any of the plurality of capacitors 151-1-151-n may be connected to the auxiliary coil 14 without being connected thereto via a switching element.

The plurality of switching elements 152-1-152-n may be a relay or an n-channel MOSFET. If the switching elements are n-channel MOSFETs, the drain terminal of the switching elements is connected to one end of the auxiliary coil 14 via the corresponding capacitor, and the source terminal of the switching elements is connected to the other end of the auxiliary coil 14. The gate terminal of the switching elements is connected to the control circuit 17.

Each switching element of the plurality of switching elements 152-1-152-n is turned on or turned off by the control circuit 17. The plurality of capacitors 151-1-151-n connected in series with the switching elements which are on affect the operation of the LC circuit. That is, the electrostatic charge in the variable capacitance circuit 15 increases as the number of switching elements turned on among the plurality of switching elements 152-1-152-n increases. Accordingly, the RMS value of the current flowing in the LC circuit increases. The phase of the current flowing in the LC circuit advances relative to the phase of the voltage applied to the transmitter coil 13; therefore, the current flowing in the LC circuit has a larger effect on the phase of the current flowing in the inverter circuit 12 in the power supply circuit 10 by the extent of the increase in the RMS value of current flowing in the LC circuit. As a result, this reduces the amount of delay in the phase of the current flowing in the switching elements with respect to the phase of the voltage applied the switching elements in the inverter circuit 12.

The communication device 16 extracts voltage information which represents the measurement value of the output voltage from a wireless signal and outputs the same to the control circuit 17 each time the communication device 16 receives the wireless signal from the communication device 25 in the power receiver 3. Therefore, the communication device 16 may include an antenna for receiving a wireless signal defined by a predetermined wireless communication standard, and a communication circuit for de-modulating the wireless signal. Note that the predetermined wireless communication standard may be ISO/IEC 15693, ZigBee (Registered Trademark), or Bluetooth (Registered Trademark).

The control circuit 17 may include a non-volatile memory circuit and a volatile memory circuit; a computation circuit; an interface circuit for connecting to other circuits; and a driving circuit for outputting a control signal to the switching elements 12a-12d in the inverter circuit 12 of the power supply circuit 10 and the switching elements 152-1-152-n in the variable capacitance circuit 15. The control circuit 17 controls the switching elements 12a-12d in the inverter circuit 12 so that the frequency of the alternating-current power supply from the power supply circuit 10 to the transmitter coil 13 is a predetermined frequency. As above described, the predetermined frequency may be established as the frequency at which the resonant circuit 20 in the power receiver 3 resonates at an expected coupling coefficient between the transmitter coil 21 and the receiver coil 13.

In an embodiment the control circuit 17 alternates turning on the switching element 12a and switching element 12d as a set, and the switching element 12b and switching element 12c as a set. The control circuit 17 may ensure that the period during which the switching element 12a and switching element 12d are on as a set during one cycle equals the period during which the switching element 12b and the switching element 12c are on as a set during one cycle; where, one cycle corresponds to the frequency of the alternating-current power supplied to the transmitter coil 13. Note that preferably, the control circuit 17 prevents the power source 11 from short-circuiting by ensuring that the set which includes the switching element 12a and the switching element 12d is not turned on at the same time as the set which includes the switching element 12b and the switching element 12c. Therefore, the control circuit 17 may establish a dead time where both sets of switching elements are off when changing the set of the switching element 12a and switching element 12d, and the set of the switching element 12b and switching element 12c from the on state to the off state. If, for instance, the inverter circuit 12 is half-bridge inverter as illustrated in FIG. 2, the control circuit 17 may alternately turn on the switching element 12a and the switching element 12b with the frequency of the alternating-current power supplied to the transmitter coil 13.

Moreover, the control circuit 17 controls electrostatic charge in the variable capacitance circuit 15 on the basis of voltage information which represents the measurement value for an output voltage. Note that the control of the electrostatic charge in the variable capacitance circuit 15 is described later in detail.

The power receiver 3 is described next. The receiver coil 21 is made up of a resonant capacitor 22 and the resonant circuit 20, and receives power from the transmitter coil 13 by resonating to the alternating-current flowing in the transmitter coil 13 in the power transmitter 2. In an embodiment, the resonant capacitor 22 is connected in series with the receiver coil 21; however, the resonant capacitor 22 may be connected in parallel with the receiver coil 21. The resonant circuit 20 may be provided with a coil connected in series with the receiver coil 21 between the receiver coil 21 and the rectifying-smoothing circuit 23. The alternating-current power output from the resonant circuit 20 is output to a load circuits (not shown) connected to the chant power trends power receiver 3 after being converted to direct-current power by the rectifying-smoothing circuit 23 The number of turns in the receiver coil 21 may be the same as the number of turns in the transmitter coil 13 or maybe different.

The rectifying-smoothing circuit 23 is one example of a rectifier circuit and, for example may includes a full wave rectifier circuit containing for individual diodes connected in a bridge configuration and a smoothing capacitor; the rectifying-smoothing circuit 23 rectifies the power output from the resonant circuit 20, smooths out the power, converting the same to direct-current power. The rectifying-smoothing circuit 23 outputs the direct-current power to a load circuit.

The voltage detection circuit 24 measures the output voltage between the terminals of the rectifying-smoothing circuit 23. The output voltage between the terminals of the rectifying-smoothing circuit 23 corresponds 121 with the output voltage of the resonance circuit 20; therefore, the measurement value of the output voltage between the terminals of the rectifying 23 smoothing circuit is indirectly the measurement value of the output voltage of the resonant circuit 20. The voltage detection circuit 24 may be configured from any of the various kinds of known voltage detection circuits capable of measuring a direct-current voltage. The voltage detection circuit 24 outputs voltage information representing the measurement value of the output voltage to the communication device 25.

The communication device 25 generates a wireless signal containing voltage information received from the voltage detection circuit 24 and transmits the wireless signal to the communication device 16 in the power transmitter 2 at each predetermined transmission cycle. Therefore, the communication device 25 may include a communication circuit for generating the wireless signal defined by a predetermined wireless communication standard and an antenna for outputting the wireless signal. Note that the predetermined wireless communication standard may be ISO/IEC 15693, ZigBee (Registered Trademark), or Bluetooth (Registered Trademark).

The details of the operation of the contactless power supply device 1 is described below; the relationship between the parameters of the circuit elements in the power transmitter 2 and the coupling coefficient for the coils for reducing the switching loss in the switching elements of the inverter circuit 12 in the power supply circuit 10 is described below.

In an embodiment, the phase of the current flowing through the transmitter coil 13 lags behind the phase of the voltage supplied to the switching elements of the power supply circuit 10 in the inverter circuit 12 if the coupling coefficient between the transmitter coil 13 and the receiver coil 21 is low, for instance, when the power receiver 3 is too far away to receive power from the power transmitter 2. The situation is the same when the current flowing in the load circuit connected to the power receiver 3 is small. At that point, the inductance in the auxiliary coil 14 and the electrostatic charge in the variable capacitance circuit 15 is established so that preferably the phase of the current flowing in the LC circuit made up of the auxiliary coil 14 and the capacitor 15 is ahead of the phase of the voltage applied to the switching elements in the power supply circuit 10. Therefore, the inductance in the auxiliary coil 14 and the electrostatic charge in the variable capacitance circuit 15 are preferably established so that the resonant frequency of the LC circuit is higher than the frequency of the alternating-current power supplied to the transmitter coil 13.

The larger inductance is also preferable in the auxiliary coil 14. This is because the larger the inductance in the auxiliary coil 14 the smaller the current flowing through the LC circuit. The inductance of the auxiliary coil 14 may be established to reduce the current flowing in the LC circuit to less than the excitation current component of the current flowing in the transmitter coil 13, which does not depend on the load on the load circuit that can be connected to the resonant circuit 20. That is, the inductance of the auxiliary coil 14 is preferably larger than the value of multiplying the expected maximum value kmax of the coupling coefficient between the transmitter coil 13 and the receiver call 21 by the inductance of the power transmitting side when the transmitter coil 13 and the receiver coil 21 are electromagnetically coupled.

Moreover, the transmitter coil 13 and the auxiliary coil 14 are preferably arranged so that the coupling coefficient between the transmitter coil 13 and the auxiliary coil 14 is higher than a maximum value came Max of the cup the assumed coupling coefficient between the transmitter coil 13 and the receiver coil 21. The transmitter coil 13 and the auxiliary coil 14 may be wound on the same core and the coupling coefficient between the transmitter call 13 on the auxiliary call 14 may be arranged with an interval therebetween to the extent that the coupling coefficient is greater than a maximum value of K max of the cup the assumed coupling coefficient between the transmitter coil 13 and the receiver coil 21. Hereby, the delay of the phase of the current flowing in the transmitter coil is reduced with respect to the phase of the voltage applied to the transmitter quote 13 and as a result, this facilitates reducing the peak value of the current when the switching elements in the inverter circuit 12 are turned off.

Figure 3A:
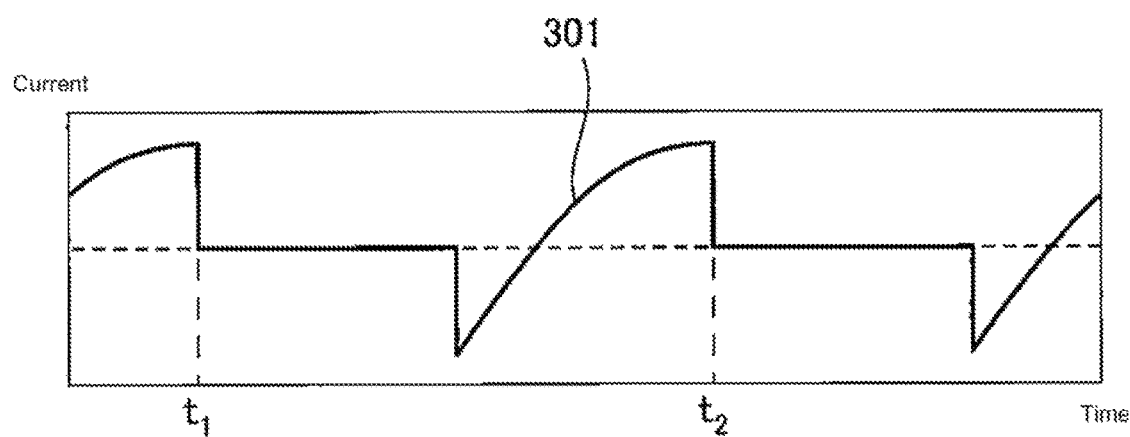
FIG. 3A is a diagram illustrating an example of current flowing through switching elements when the coupling coefficient between a transmitter coil and an auxiliary coil is smaller than the coupling coefficient between the transmitter coil and a receiver coil.
Figure 3B:
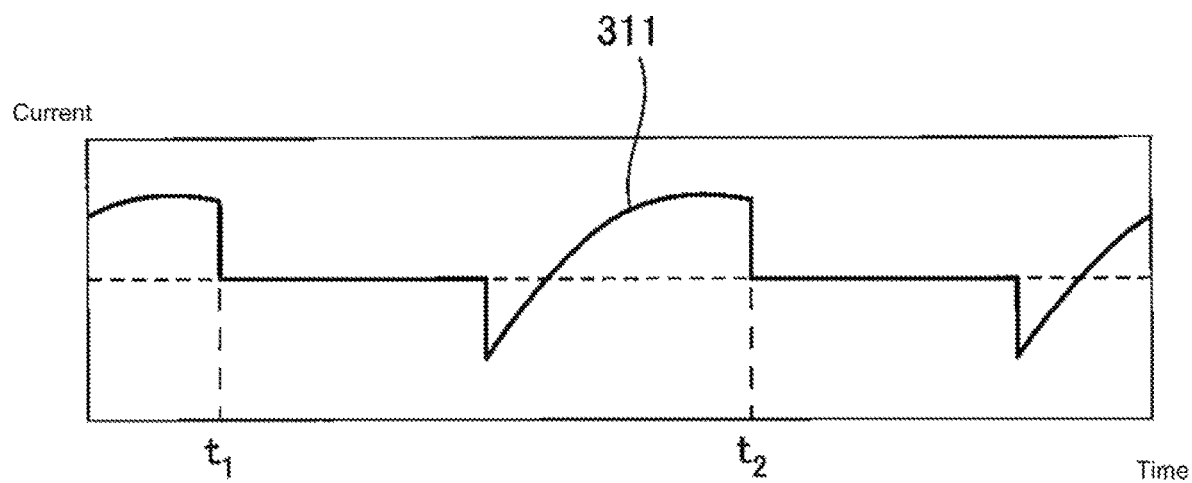
FIG. 3B is a diagram illustrating an example of current flowing through switching elements when the coupling coefficient between a transmitter coil and an auxiliary coil equals the coupling coefficient between the transmitter coil and a receiver coil.

FIG. 3A illustrates an example of the current flowing through the switching elements when the coupling coefficient between the transmitter coil 13 and the auxiliary coil 14 is smaller than the coupling coefficient between the transmitter coil 13 and the receiver coil 21 as determined via simulation; FIG. 3B illustrates an example of the current flowing in the switching elements when the coupling coefficient between the transmitter coil 13 and the auxiliary coil 14 equals the coupling coefficient between the transmitter coil 13 and the receiver coil 21; and FIG. 3C illustrates an example of the current flowing in the switching elements when the coupling coefficient between the transmitter coil 13 and the auxiliary coil 14 is greater than the coupling coefficient between the transmitter coil 13 and the receiver coil 21.

Figure 3C:
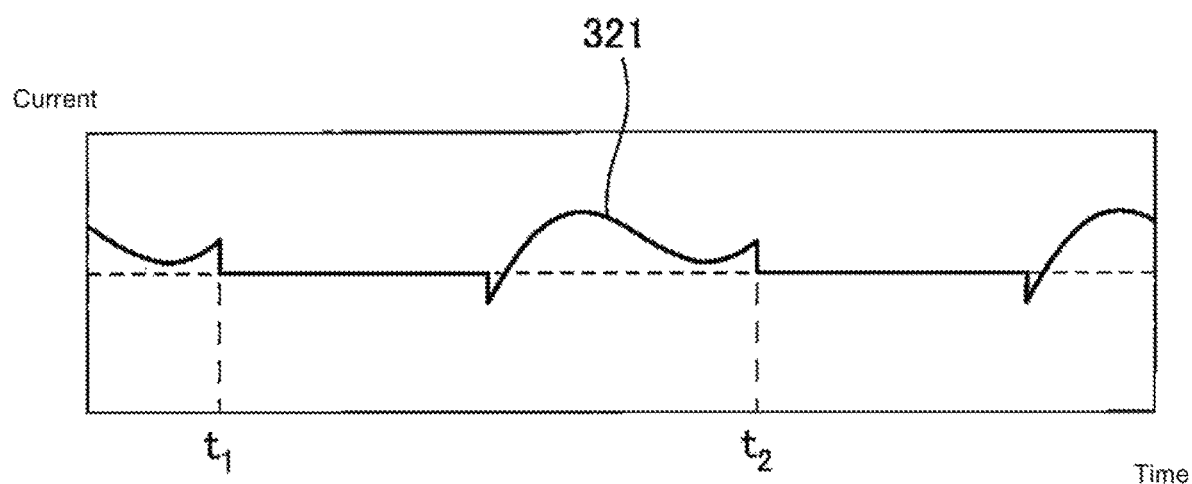
FIG. 3C is a diagram illustrating an example of current flowing in switching elements when the coupling coefficient between a transmitter coil and an auxiliary coil is greater than the coupling coefficient between the transmitter coil and a receiver coil.

The inverter circuit 12 in the simulations depicted in FIG. 3A through FIG. 3C is the half-bridge inverter illustrated in FIG. 2. The inductance in the transmitter coil 13 was 91 µH and the electrostatic charge in the capacitor 12e was 220 nF. The inductance in the auxiliary coil 14 is 100 micro Henry, and the electrostatic charge in the variable capacitance circuit 15 is 30 nF. The inductance in the receiver coil 21 was 121 µH and the electrostatic charge in the resonant capacitor 22 was 60 nF. The resistance value Ro of the load circuit connected to the power receiver 3 was 10Ω. The coupling coefficient k12 between the transmitter coil 13 and the receiver coil 21 was 0.2; the coupling coefficient k13 between the transmitter coil 13 and the auxiliary coil 14 was 0.1; and the coupling coefficient k23 between the auxiliary coil 14 and the receiver coil 21 was 0.2 in the simulation depicted in FIG. 3A. The coupling coefficient k12 between the transmitter coil 13 and the receiver coil 21, the coupling coefficient k13 between the transmitter coil 13 and the auxiliary coil 14, and the coupling coefficient k23 between the auxiliary coil 14 and the receiver coil 21 were all 0.2 in the simulation depicted in FIG. 3B. The coupling coefficient k12 between the transmitter coil 13 and the receiver coil 21 was 0.2 and the coupling coefficient k23 between the auxiliary coil 14 and the receiver coil 21 was 0.2; and the coupling coefficient k13 between the transmitter coil 13 and the auxiliary coil 14 was 0.7 in the simulation depicted in FIG. 3C.

In the graphs in FIG. 3A through FIG. 3C, the horizontal axis represents time and the vertical axis represents the amount of current. The times t1 and t2 represents the timing at which the switching element 12a is turned off. The waveform 301 in FIG. 3A represents the waveform of the current flowing in the switching element 12a when the coupling coefficient k12 is greater than the coupling coefficient k13. Similarly, the waveform 311 in FIG. 3B represents the waveform of the current flowing in the switching element 12a when the coupling coefficient k12 is equal to the coupling coefficient k13. The waveform 321 in FIG. 3C represents the waveform of the current flowing in the switching element 12a when the coupling coefficient k12 is less than the coupling coefficient k13.

As illustrated by the waveforms 301, 311 and 321 it can be understood that the greater the coupling coefficient k13 between the transmitter coil 13 and the auxiliary coil 14 relative to the coupling coefficient k12 between the transmitter coil 13 and the receiver coil 21, the smaller the peak value of the current when the switching elements in the inverter circuit 12 and the RMS value of the current flowing in the switching elements. From this, it can be further understood that it is preferable for the coupling coefficient k13 is greater than the coupling coefficient k12.

Figure 4:
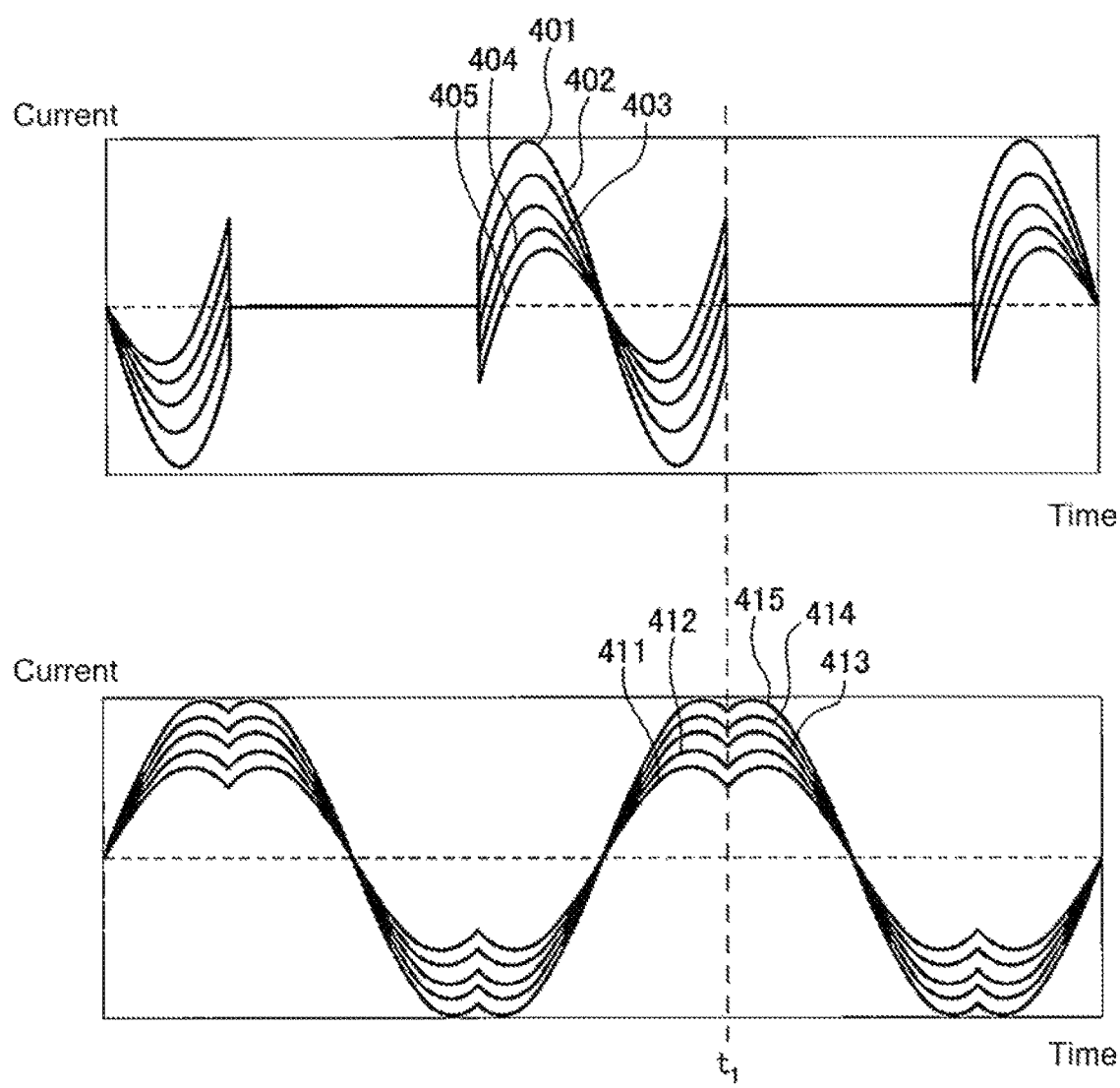
FIG. 4 is a diagram illustrating one example of the relationship between the electrostatic capacity in a variable capacitance circuit, and current flowing in switching elements in an inverter circuit and current flowing through an auxiliary coil as determined via simulation.

FIG. 4 illustrates one example of the relationship between the electrostatic capacity in the variable capacitance circuit 15, and the current flowing in the switching elements in the inverter circuit 12 and the current flowing through the auxiliary coil 14 as determined via simulation. The parameter values for the circuit elements in the simulation depicted in FIG. 4 are identical to the parameter values in the simulations depicted in FIG. 3A through FIG. 3C except for the circuit elements related to the electrostatic charge in the variable capacitance circuit 15. The coupling coefficient between the transmitter coil 13 and the receiver coil 21 and the coupling coefficient between the auxiliary coil 14 and the receiver coil 21 are 0.2, while the coupling coefficient between the transmitter coil 13 and the auxiliary coil 14 is 0.7.

In the graphs in FIG. 4, the horizontal axis represents time and the vertical axis represents the amount of current. Additionally, the time t1 represents the timing at which the switching element 12b is turned on. Each of the waveforms 401-405 presented in the upper graph represents the current flowing in the switching element 12b when the electrostatic capacity in the variable capacitance circuit 15 is increased sequentially by 2 nF from 30 nF. Each of the waveforms 411-415 in the lower graph represents the current flowing through the auxiliary coil 30 when the electrostatic capacity in the variable capacitance circuit 14 is increased sequentially by 2 nF from 15 nF.

As illustrated by the waveforms 401-405, when the switching element 12b is turned off, the peak value of the current flowing through the switching element 12b decreases by the extent of the increase in the electrostatic charge in the variable capacitance circuit 15. Meanwhile, as illustrated by the waveforms 411-415, the RMS value of the current flowing in the auxiliary coil 14 rises by the extent of the increase in the electrostatic charge in the variable capacitance circuit 15.

Figure 5:
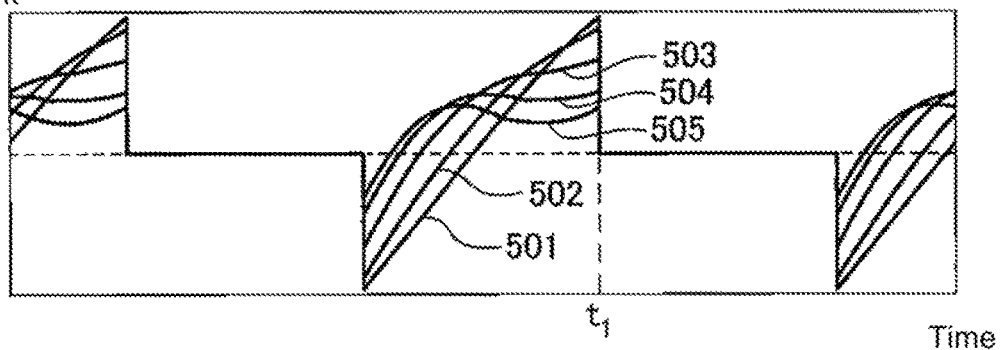
FIG. 5 is a diagram illustrating an example of the relationship between the coupling coefficient for a transmitter coil and a receiver coil, the output voltage from the power receiver, and the current flowing in a switching element in an inverter circuit when the power transmitter does not include an LC circuit; the relationship was determined via simulation.
Figure 5:
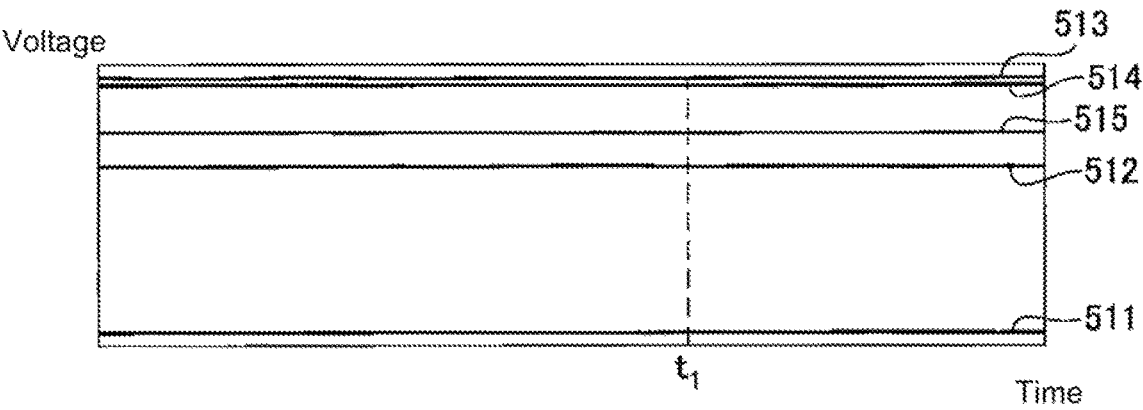

FIG. 5 illustrates an example of a relationship between the coupling coefficient for the transmitter coil 13 and receiver coil 21, the output voltage from the power receiver 3, and the current flowing in a switching element 12b in the inverter circuit 12 when the power transmitter 2 does not include an LC circuit; the relationship was determined via simulation. The parameter values for the circuit elements in the simulation depicted in FIG. 5 are identical to the parameter values in the simulations depicted in FIG. 3A through FIG. 3C except for the circuit elements excluded with the auxiliary coil 14 and the variable capacitance circuit 15.

In the graphs in FIG. 5, the horizontal axis represents time; in the upper graph in FIG. 5, the vertical axis represents the amount of current, and in the lower graph the vertical axis represents the voltage. Additionally, the time t1 represents the timing at which the switching element 12b is turned on. Each of the waveforms 501-505 in the upper graph represents the current flowing in the switching element 12b when the coupling coefficient between the transmitter coil 13 and the receiver coil 21 increases by 0.1 from 0.1. Each of the waveforms 511-515 in the lower graph represents the output voltage output from the power receiver 3 when the coupling coefficient between the transmitter coil 13 and the receiver coil 21 increases by 0.1 from 0.1.

As illustrated by the waveforms 501 through 505, the amount of delay in the phase of the current flowing in the switching element 12b with respect to the phase of the voltage applied to the switching elements 12b increases by the extent of the decrease in the coupling coefficient between the transmitter coil 13 and the receiver coil 21. Therefore, the RMS value of the current flowing in the switching element 12b increases, and when the switching elements is turned off the peak value of the current flowing in the switching element 12b increases by the extent of the decrease in the coupling coefficient between the transmitter coil 13 and the receiver coil 21. Whereas, as illustrated by the waveforms 511-515, the output voltage from the power receiver 3 varies with changes in the coupling coefficient between the transmitter coil 13 and the receiver coil 21.

Thus, it is clear that it is sufficient to vary the electrostatic charge in the variable capacitance circuit 15 in accordance with the output voltage from the power receiver 3 to reduce the RMS value of the current flowing in the switching elements and reduce the peak value of the current flowing in the switching elements in the inverter circuit 12 when the switching elements in the inverter circuit 12 are turned off. However, the electrostatic charge in the variable capacitance circuit 15 is preferably on the lower side to reduce the conduction loss due to the current flowing in the LC circuit which includes the auxiliary coil 14 and the variable capacitance circuit 15.

At that point, when the measurement value of the output voltage represented by the voltage information received from the power receiver 3 is within a predetermined lower limit threshold, the control circuit 17 references a reference table preliminarily stored in memory in the control circuit 17 and representing a correspondence relationship between the present electrostatic charge in the variable capacitance circuit 15 and the electrostatic charge after a change in the variable capacitor circuit 15 when the measurement value of the output voltage is within the lower limit threshold, i.e., a correspondence relationship of the combination of the plurality of switching elements 152-1-152-n in the variable capacitance circuit 15 that should be turned on. The control circuit 17 identifies the combination of switching elements that should be turned on which corresponds to the present electrostatic charge in the variable capacitance circuit 15. The control circuit 17 controls the variable capacitance circuit 15 so that the switching elements in the combination identified are turned on and the other switching elements are turned off. Note that simulation or experimentation may be used to preliminarily obtain the combination of switching elements capable of reducing the peak value of the current flowing in the switching elements when the switching elements in the inverter circuit 12 are turned on for each level of the electrostatic charge in the variable capacitance circuit 15; simulation or experimentation may also be used to preliminary obtain the combination of switching elements capable of preventing an increase in the RMS value of the current flowing in the switching elements and in the RMS value of the current flowing in the auxiliary coil 14 for each level of the electrostatic charge in the variable capacitance circuit 15; furthermore, a reference table may be created on the basis of these combinations. The electrostatic charge in the variable capacitance circuit 15 may thus vary; consequently, the peak value of the current flowing in the switching elements decreases when switching elements in the inverter circuit 12 are turned off and reduces the switching loss; this also prevents an increase in the RMS value of the current flowing in the switching elements and an increase in the conduction loss. Moreover, this prevents an increase in the RMS value of the current flowing in the auxiliary coil 14 and prevents an increase in the conduction loss from the LC circuit which includes the auxiliary coil 14.

Similarly, when the measurement value of the output voltage represented by the voltage information received from the power receiver 3 is exceeds a predetermined upper limit threshold that is greater than the above predetermined lower limit threshold, the control circuit 17 references a reference table preliminarily stored in memory therein and representing a correspondence relationship between the present electrostatic charge in the variable capacitance circuit 15 and the electrostatic charge after a change in the variable capacitor circuit 15 when the measurement value of the output voltage is exceeds that upper limit threshold, i.e., a correspondence relationship of the combination of the plurality of switching elements 152-1-152-n in the variable capacitance circuit 15 that should be turned on. The control circuit 17 may identify the combination of switching elements that should be turned on which corresponds to the present electrostatic charge in the variable capacitance circuit 15. The control circuit 17 may control the variable capacitance circuit 15 so that the switching elements in the combination identified are turned on and the other switching elements are turned off.

As above described, the power transmitter in the contactless power supply device includes a variable capacitance circuit which along with an auxiliary coil that is arranged for electromagnetic coupling with transmitter coil constitutes an LC circuit; the variable capacitance circuit is configured to adjust a delay of the phase of the current flowing in switching elements in the inverter circuit with respect to the phase of the voltage applied to the switching elements of inverter circuit in the power supply circuit which supplies alternating-current power to the transmitter coil. The control circuit in the power transmitter controls the electrostatic charge in the variable capacitance circuit in accordance with the voltage output from the power receiver. Therefore, the contactless power supply device is capable of maintaining an amount of delay that is suitable for the phase of the current flowing in the switching elements with respect to the phase of the voltage applied to the switching elements in the inverter circuit even when the coupling coefficient between the transmitter coil and the receiver coil varies; consequently, this reduces the switching loss in the switching elements and the conduction loss in the LC circuit.

Moreover, in the above modification example a control circuit may be established for controlling the electrostatic charge of the variable capacitance circuit 15 separately from the control circuit 17 which controls the inverter circuit 12.

A person having ordinary skill in the art may make various modifications in the above manner within the scope of the invention in accordance with how the device will be used.

The invention claimed is:

1. A contactless power supply device comprising:
a power transmitter; and
a power receiver configured to accept a power transmission from the power transmitter without contact;
the power receiver comprising:
a resonant circuit comprising a receiver coil and a resonant capacitor for resonating with the receiver coil and configured to receive power from the power transmitter;
a rectifier circuit configured to rectify the power output from the resonant circuit;
a voltage detection circuit configured to measure the output voltage of the power output from the rectifier circuit and obtain a measurement value for the output voltage; and
a first communication device configured to transmit a signal containing the measurement value for the output voltage to the power transmitter;
the power transmitter comprising:
a transmitter coil configured to supply power to the power receiver via the receiver coil;
a power supply circuit comprising a power source configured to supply direct-current power, and a plurality of switching elements connected in a full-bridge or half-bridge configuration between the power source for supplying direct-current power and the transmitter coil; the plurality of switching elements switching between on and off states at a predetermined frequency to thereby convert the direct-current power supplied by the power source into alternating-current power of a predetermined frequency which is supplied to the transmitter coil;

an auxiliary coil configured for electromagnetic coupling with the transmitter coil;

a variable capacitance circuit configured for connection to the auxiliary coil, and the variable capacitance circuit configured to be capable of adjustment of the electrostatic charge therein;

a second communication device configured to receive a signal from the power receiver containing the measurement value for the output voltage; and a control circuit configured to control the electrostatic charge in the variable capacitance circuit in accordance with the measurement value for the output voltage.

2. A contactless power supply device according to claim 1, wherein: the control circuit in the power transmitter is configured to reference a reference table expressing a relationship between the present value of the electrostatic charge in the variable capacitance circuit and the electrostatic charge after a change in response to a measurement value for the output voltage being below a predetermined lower limit threshold or exceeding a predetermined upper limit threshold that is greater than the predetermined lower limit threshold, and control the variable capacitance circuit so that the present electrostatic charge becomes the electrostatic charge after the change.

* * * * *